United States Patent [19]

Pedersen

[11] 4,008,455
[45] Feb. 15, 1977

[54] METHOD OF MAKING SELF-CALIBRATED DISPLACEMENT MEASUREMENTS

[75] Inventor: Herbert N. Pedersen, Richland, Wash.

[73] Assignee: Westinghouse Electric Corporation, Pittsburgh, Pa.

[22] Filed: Feb. 24, 1975

[21] Appl. No.: 552,582

[52] U.S. Cl. .............................. 340/1 R; 73/7.8 R; 73/552; 176/19 R
[51] Int. Cl.² ......................................... G01S 9/68
[58] Field of Search ............... 73/552, 67, 67.5 R, 73/67.7, 67.8 R, 67.9, 71.5 US; 340/1 R, 1 L; 176/19 R

[56] References Cited

UNITED STATES PATENTS

| | | | |
|---|---|---|---|
| 2,931,978 | 4/1960 | Erdman | 73/67.8 S |
| 3,237,150 | 2/1966 | Beck et al. | 176/19 R |
| 3,789,663 | 2/1974 | Gold | 73/194 E |

FOREIGN PATENTS OR APPLICATIONS

| | | | |
|---|---|---|---|
| 2,122,190 | 11/1972 | Germany | 176/19 R |

OTHER PUBLICATIONS

Lynnworth et al., "Nuclear Reactor Applications of New Ultrasonic Transducers," Nuclear Science Symposium, Nov. 1970, pp. 351–362.

*Primary Examiner*—Herbert Goldstein
*Assistant Examiner*—Stephen A. Kreitman
*Attorney, Agent, or Firm*—D. C. Abeles; Z. L. Dermer

[57] ABSTRACT

A method for monitoring the displacement of an object having an acoustically reflective surface at least partially submerged in an acoustically conductive medium. The reflective surface is designed to have a stepped interface responsive to an incident acoustic pulse to provide separate discrete reflected pulses to a receiving transducer. The difference in the time of flight of the reflected acoustic signals corresponds to the known step height and the time of travel of the signals to the receiving transducer provides a measure of the displacement of the object. Accordingly, the reference step length enables simultaneous calibration of each displacement measurement.

3 Claims, 3 Drawing Figures

METHOD OF MAKING SELF-CALIBRATED DISPLACEMENT MEASUREMENTS

BACKGROUND OF THE INVENTION

The invention described herein was made in the course of, or under a contract with the United States Atomic Energy Commission, and pertains generally to a method for acoustically monitoring the displacement of objects and more particularly to a method for providing self-calibrated displacement measurements applicable to a liquid metal breeder reactor environment.

In nuclear reactors it is desirable to provide an early indication of the displacement of core components in order to avoid abnormal operating conditions. The displacement of core components is usually indicative of a failure of a core support structure which can cause a blockage of coolant flow, resulting in a rise in core temperature to an undesirable and abnormal level. In the unlikely event of such a failure early detection can enable the plant operator to implement corrective action to avoid operating conditions which might otherwise necessitate the complete shutdown of the reactor system.

State of the art displacement sensors are generally not compatible with the in-core monitoring environment of fast breeder reactors, due to the severe high temperatures and electrically conductive, caustic nature of the sodium coolant.

For example, state of the art displacement indicators applied to nuclear reactor applications such as are described in the patents to R. Wildgoose, U.S. Pat. No. 3,296,081 and J. C. Singleton et al, U.S. Pat. No. 3,492,616, employ magnetically permeable material in combination with movable piston-cylinder arrangements, i.e., linear voltage differential transformers with movable cores, which are not particularly suitable for in-core monitoring applications. This is especially true in liquid metal reactor applications due to the caustic nature of the core environment. Adapting such transducers generally requires a bellow seal to isolate the transducer from the sodium coolant while enabling longitudinal movement of the piston. It is generally accepted that the integrity of such seals is highly susceptible to failure during the desired operating lifetime of up to ten years. Furthermore, the high temperatures experienced in the core of a fast breeder reactor severely degrades the magnetic permeability of the materials employed and thus the detectors response.

While linear differential transformer transducers have been constructed with non-magnetic cores such as the transducer described in the patent to Church, U.S. Pat. No. 3,484,678, a severe problem still exists in isolating the piston from the core environment while enabling longitudinal movement of the piston shaft, which is used to translate core motion into an electrical output.

Many of these disadvantages have been addressed in application Ser. No. 547,074, filed Feb. 4, 1975, which describes an eddy current position indicator. However, the apparatus described still requires positioning of instrumentation within the core and periodic calibration to account for changes in electrical conductivity of the core cooling medium due to changes in temperature.

In addition to the displacement sensors already mentioned, acoustic position indicating devices have been constructed which rely on various characteristics of acoustic signals. However, such state of the art acoustic devices require exhaustive calibration procedures to offset changes in the sound propagation velocity resulting from temperature changes in the surrounding environment.

Accordingly, an improved method of core displacement is desired that does not require the use of magnetically permeable material. Additionally, a new displacement method is desired that will provide a self-calibrated measurement to offset changes in environmental parameters. Furthermore, a new reactor core displacement sensor is desired that can function reliably, totally isolated from the core environment, for extended periods of operation.

SUMMARY OF THE INVENTION

Briefly, this invention provides a method for measuring the displacement of an object at least partially submerged in an acoustically conductive medium wherein the submerged portion of the object has at least one acoustically reflective surface. A pulse of acoustic energy is directed toward the reflective surface of the object in a manner that will provide first and second discrete reflected acoustic signals. The first and second discrete signals travel corresponding first and second paths to an appropriate acoustic receiver. The reflective surface is designed to direct the reflected signals along return paths of unequal length, wherein the difference in the length of the paths is known. A measure of the travel time of the two signals to the receiver is determined and cross-correlated to establish a measure of displacement of the object monitored relative to the receiver location.

In a preferred embodiment the difference in the length of travel of the two signals is governed by a predetermined relationship which is coordinated with the time of travel of the two signals as a calibrating standard for each displacement measurement. This standard, is in effect, updated every time a measurement is obtained. In its most desired form the reflective surface is constructed to have a step discontinuity of a known length. The discontinuity provides two discrete reflected signals with the length of the step serving as the calibrating standard.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

This invention provides a method for measuring the displacement of objects and is specifically suitable for application in adverse environments, which because of their caustic nature require repeated calibration to assure the accuracy of the monitored parameters. Such adverse operating conditions are commonly experienced in fast breed reactor facilities due to the high temperatures encountered; the caustic nature of the sodium coolant employed as the heat transfer medium; and the high energy neutron flux levels generated. The method of this invention will be described as applied to such an application in order to demonstrate the particular benefits achieved by its implementation, though it should be understood that this invention can be applied to a wide variety of acoustic measuring applications eg. sonar exploration of undersea terrains.

Figure 1:
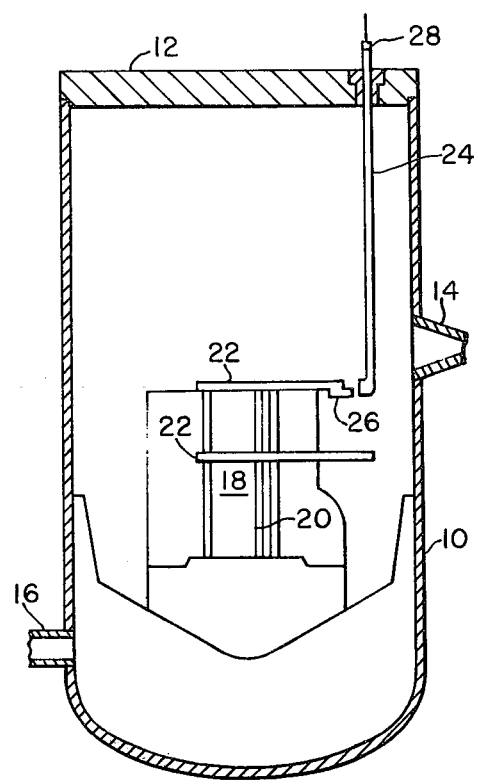
FIG. 1 is a schematic illustration of a liquid metal fast breeder reactor showing the core and core restraint structure incorporating the monitoring apparatus of this invention.

A pressurized vessel 10 of the liquid metal fast breeder reactor type is shown in FIG. 1, which forms a pressurized container when sealed by its head assembly 12. The vessel has coolant flow inlet means 16 and coolant flow outlet means 14 formed integral with and through its cylindrical walls. As is known in the art, the vessel 10 contains a nuclear core 18 consisting mainly of a plurality of clad nuclear fuel elements 20 which generate substantial amounts of heat depending primarily upon the position of control means, not shown, generally known in the art as control rods. The heat generated by the reactor core is conveyed from the core by the liquid sodium coolant flow entering through inlet means 16 and exiting through outlet means 14. Generally, though not shown, the flow exiting through outlet means 14 is conveyed through a hot leg conduit to a heat exchanger, steam generator system, wherein the heated coolant flow is conveyed through tubes which are in heat exchange relationship with water which is utilized to produce steam. The steam produced by the generator is commonly utilized to drive a turbine for the production of electricity. The flow of liquid metal coolant is conveyed from the steam generator through a cool leg conduit to inlet means 16. Thus a closed recycling primary or steam generating loop is provided with the coolant piping coupling the vessel 10 and the steam generator. The vessel illustrated in FIG. 1 is adaptable for one such closed fluid flow system or loop, though, it should be understood that the number of such loops can vary from plant to plant, but commonly 2, 3 or 4 are employed in conventional reactors.

The flow of liquid metal coolant entering through inlet means 16 and traversing the core to the outlet nozzle 14 can induce vibrations in the various core components. Furthermore, displacement of the core can occur in the unlikely event of a failure of a core support structure. Therefore, as an advance indication of such adverse operating conditions, it is advantageous to monitor changes in position of the core structural components.

The core 18, illustrated within the pressure vessel 10 of FIG. 1, is mechanically confined in position with the assistance of a plurality of core restraint yokes 22. Motion of the core will be translated through this mechanical coupling to the confining yokes. Thus, motion of the core restraint yokes can be monitored as an indication of actual core displacement.

The transducer 28, which is shown in FIG. 1 for implementing the preferred mode of practicing this invention can be any one of a number of acoustic transducers available in the art capable of generating and receiving pulsed acoustic energy. In this particular embodiment the transducer face 28 is coupled to a wave guide 24, which focuses the acoustic output on an edge 26 of the core restraint yoke. The edge of the core restraint yoke is desirably machined to have a stepped discontinuity. The discontinuity functions as an acoustically reflective surface and provides two discrete back radiated signals for every incident pulse, as will be appreciated from the following discussion.

The method of this invention employs the time of flight of an acoustic pulse between a transducer and the object being monitored as a measure of distance. Assuming the propagation velocity is constant and accurately known, the time of flight will then be proportional to the distance. The problem however, is that the velocity of sound in the medium through which the ultrasonic energy travels varies as a function of temperature. In most applications, the temperature of the medium in the monitored location is not generally known, or varies considerably with time. Accordingly, any displacement measurements obtained will be highly inaccurate unless repeatedly calibrated.

Figure 2:
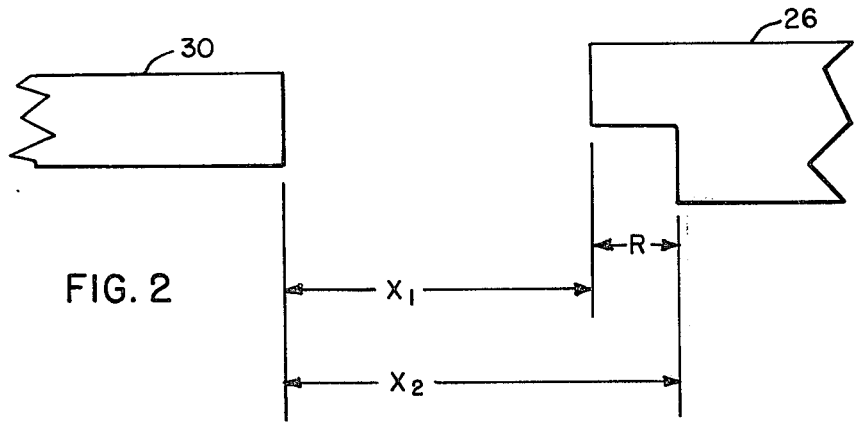
FIG. 2 is a schematic illustration of a transducer and reflector assembly employed in the steps of this invention.
Figure 3:
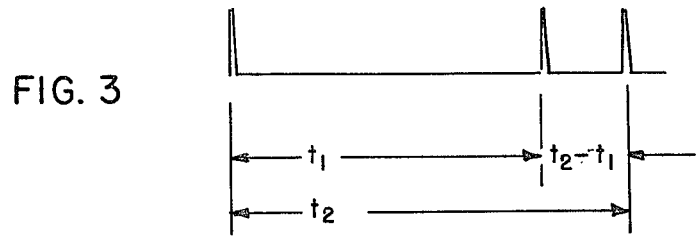
FIG. 3 is a graphical representation of the signals employed in practicing the method of this invention.

FIG. 2 shows a schematic representation of the preferred mode of implementing the method of this invention for providing both displacement and calibration measurements simultaneously. FIG. 3 provides a graphical representation of the acoustic signals involved in the steps of this method. In its simplest form two pieces of apparatus are fundamental to the operation of this particular embodiment. The first is a source of ultrasound 30 which is representative of the transducer 28 wave guide 24 assembly previously illustrated in FIG. 1, and the second is the step reflector 26 previously identified in FIG. 1 as forming an edge of the core restraint yoke 22. The source of ultrasound 30 emits a wave of pulsed acoustic energy at a time $T_o$ which travels through an acoustically conductive medium and rebounds off of the reflector 26. Due to the stepped geometry of the reflector, the first pulse will return at a time $T_1$ and the second pulse will be received by the source of ultrasound at a time $T_2$. The length of the step, which is employed as a reference length, is accurately known and is essentially independent of variations in temperature and radiation effects. These desired characteristics can be assured by employing a construction material such as tunsten, which has a coefficient of linear expansion of $2.56 \times 10^{-6}$ inches/inches/° F over a range of approximately 68° – 1060° F.

In FIG. 2 the corresponding distances of travel for the first and second reflected signals are represented by $X_1$ and $X_2$. These distances, along with the reference length R, can be represented by the following equations:

$$X_1 = V_0 (T_{1/2}), \qquad (1)$$

$$X_2 = V_0 (T_{2/2}),$$

$$R = X_2 - X_1;$$

where $V_0$ is the sound propagation velocity of the medium through which the acoustic energy wave travels and $T_1$ and $T_2$ are the corresponding travel times of the reflected signals as illustrated in FIG. 3. Upon substituting for the value of $X_1$ and $X_2$, R becomes:

$$R = V_0/2 \, (T_2 - T_1). \qquad (2)$$

Solving for $V_0$ the following equation is obtained:

$$V_0 = 2R/(T_2 - T_1). \qquad (3)$$

Upon substituting equation (3) for $V_0$ in equation (1), the following is obtained:

$$X_1 = RT_1/(T_2 - T_1), \qquad (4)$$

in which $X_1$ is expressed in known or measurable quantities. The measurement error equation is:

$$X_1 = \delta X_1/\delta R \,(\Delta R) + \delta X_1/\delta T_2 \,(\Delta T_2) + \delta X_1/\delta T_1 \,(\Delta T_1) \qquad (5)$$

Taking the various partial derivatives the following is obtained:

$$\Delta X_1 = (T_1/(T_2 - T_1))\,\Delta R + (RT_1/(T_2 - T_1))\,(\Delta T_1 - \Delta T_2) + (R/(T_2 - T_1))\Delta T_1. \qquad (6)$$

Since, in practice $T_1$ and $T_2$ can be measured to the same accuracy, the assumption can be made that $\Delta T_2 = \Delta T_1$. Therefore, the equation can be simplified to the following form:

$$X_1 = (T_1/(T_2 - T_1))\Delta R + (R/(T_2 - T_1))\Delta T_1. \qquad (7)$$

The equation can be simplified further by requiring that R be much less that $\Delta X_1$, which means that the inaccuracy in the reference must be smaller than the minimum error in the measurement of $X_1$. Since this is usually the case, the following equation can be written:

$$\Delta X_1 = (R/(T_2 - T_1))\,\Delta T_1. \qquad (8)$$

Thus, it is evident, that the error in $X_1$ is directly proportional to the error in the measurement of $T_1$.

The calibration of this measurement method is performed each time a measurement is made. Using a pair of digital elapsed time counters, the velocity term is adjusted until $T_2-T_1$ is some constant value. The value never changes since R is a fixed parameter. Hence, if each time $T_1$ is measured to determine $X_1$ to give the displacement measurement, $T_2$ and $T_2 - T_1$ are also recorded, the system will be simultaneously calibrated.

Though the preferred mode has been shown employing a single transducer receiver assembly with a step reflector it should be appreciated that separate transmitters and receivers can be employed with other reflector geometries to obtain two discrete reflected signals measured at two unequal distances. For example, a flat plate reflection can be employed with stepped receivers. So long as the difference in length of travel of the reflected signals is governed by a fixed predetermined relationship, both displacement and calibration can be made simultaneously as provided for by this invention.

What is claimed is:

1. An on-line method of measuring the displacement of a core of a nuclear reactor designed to be substantially stationarily supported within the reactor during reactor operation and cooled by an acoustically conductive medium wherein an acoustically reflective surface formed with a step discontinuity of known height between parallel legs of the step, is fixedly coupled to the core and submerged within the coolant, comprising the steps of:
   directing at least one acoustic pulse to impinge upon the step discontinuity on the reflective surface in a manner that will provide first and second discrete reflected acoustic signals respectively reflecting off of the respective legs of the step;
   detecting the first and second discrete reflected signals at a corresponding first and second distance from the reflecting surface where the first and second distances differ in length by the known height;
   determining a measure of the time of travel of the first and second signals; and
   cross-correlating the time of travel of the respective signals with the known height to provide a calibrated measure of displacement.

2. The method of claim 1 wherein the directing and detecting steps employ a single ultrasonic transducer operating in both a generating and receiving mode.

3. A nuclear reactor including a vessel constructed to form a hermetic container when sealed by a head enclosure, the vessel housing a nuclear core for generating heat and means for circulating an acoustically conductive cooling medium through the core to transport the heat generated within the core to the exterior of the vessel, the core being designed to be substantially stationarily supported within the vessel and having an acoustically reflective surface formed with a step discontinuity of known height between parallel legs of the step, fixedly coupled to the core and submerged in the coolant and further comprising: means for generating and receiving an acoustic pulse and for converting received acoustic signals into a corresponding electrical output; means for directing the acoustic to impinge upon the step discontinuity on the reflective surface in a manner to reflect first and second discrete acoustic signals respectively off of the respective legs of the step and guide the reflected first and second discrete acoustic signals to the receiving means; and means for transporting the electrical output of the receiving means, exterior of the vessel to indicate the time of reception of the first and second discrete acoustic signals which is indicative of a calibrated measurement of motion of the core.

* * * * *